United States Patent
Gondal et al.

(10) Patent No.: US 11,759,754 B2
(45) Date of Patent: *Sep. 19, 2023

(54) STAINLESS STEEL FILTER MEMBRANE WITH IRON OXIDE COATING

(71) Applicant: King Fahd University of Petroleum and Minerals, Dhahran (SA)

(72) Inventors: Mohammed A. Gondal, Dhahran (SA); Talal F. Qatan, Dhahran (SA); Mohamed A. Dastageer, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/937,843

(22) Filed: Oct. 4, 2022

(65) Prior Publication Data

US 2023/0027081 A1 Jan. 26, 2023

Related U.S. Application Data

(63) Continuation of application No. 16/245,360, filed on Jan. 11, 2019, now Pat. No. 11,478,761.

(60) Provisional application No. 62/642,954, filed on Mar. 14, 2018.

(51) Int. Cl.
*B01D 71/02* (2006.01)
*B01D 61/14* (2006.01)
*C02F 1/32* (2023.01)
*C02F 1/44* (2023.01)
*C02F 101/32* (2006.01)

(52) U.S. Cl.
CPC ......... *B01D 71/022* (2013.01); *B01D 61/147* (2013.01); *B01D 71/024* (2013.01); *C02F 1/32* (2013.01); *C02F 1/444* (2013.01); *B01D 2311/2611* (2013.01); *B01D 2325/36* (2013.01); *C02F 2101/32* (2013.01)

(58) Field of Classification Search
CPC .. B01D 71/022; B01D 71/024; B01D 61/147; B01D 2311/2611; B01D 2325/36; C02F 1/32; C02F 1/444; C02F 2101/32
See application file for complete search history.

(56) References Cited

U.S. PATENT DOCUMENTS

2017/0056834 A1 3/2017 Bhushan

FOREIGN PATENT DOCUMENTS

| CN | 103100309 B | 6/2015 |
|---|---|---|
| CN | 105148564 B | 5/2017 |
| JP | 2003-285083 A | 10/2003 |

(Continued)

OTHER PUBLICATIONS

Tang, et al.; Porous stainless steel supported magnetite crystalline membranes for hexavalent chromium removal from aqueous solutions; Journal of Membrane Science 392-393; pp. 150-156; Dec. 24, 2011; 7 Pages.

(Continued)

*Primary Examiner* — Vishal V Vasisth
(74) *Attorney, Agent, or Firm* — Oblon, McClelland, Maier & Neustadt, L.L.P.

(57) ABSTRACT

A universal, scalable, solvent-free, one-step method for thermal annealing a stainless steel membrane to create a superhydrophilic surface. The superhydrophilic membrane itself, and methods for using it to separate oil and water in an oil and water mixture or for photocatalytic degradation of methylene blue and other organic contaminants.

16 Claims, 10 Drawing Sheets

(56) References Cited

FOREIGN PATENT DOCUMENTS

WO 2015/180873 A1 12/2015

OTHER PUBLICATIONS

Zhu, et al. ; The preparation and chemical structure of TiO film photocatalysts supported on stainless steel substrates via the sol-gel method ; Journal of Materials Chemistry, Issue 7 ; 2001 ; Abstract Only ; 2 Pages.

Song, et al. ; Self-Driven One-Step Oil Removal from Oil Spill on Water via Selective-Wettability Steel Mesh ; ACS Applied Materials & Interfaces 6 (22) ; pp. 19858-19865 ; 2014 ; Abstract Only ; 2 Pages.

Gondal, et al. ; Fabrication and Wettability Study of WO3 Coated PhotocatalyticMembrane for Oil-WaterSeparation: A Comparative Study with ZnO Coated Membrane ; Scientific Reports ; May 10, 2017 ; 10 Pages.

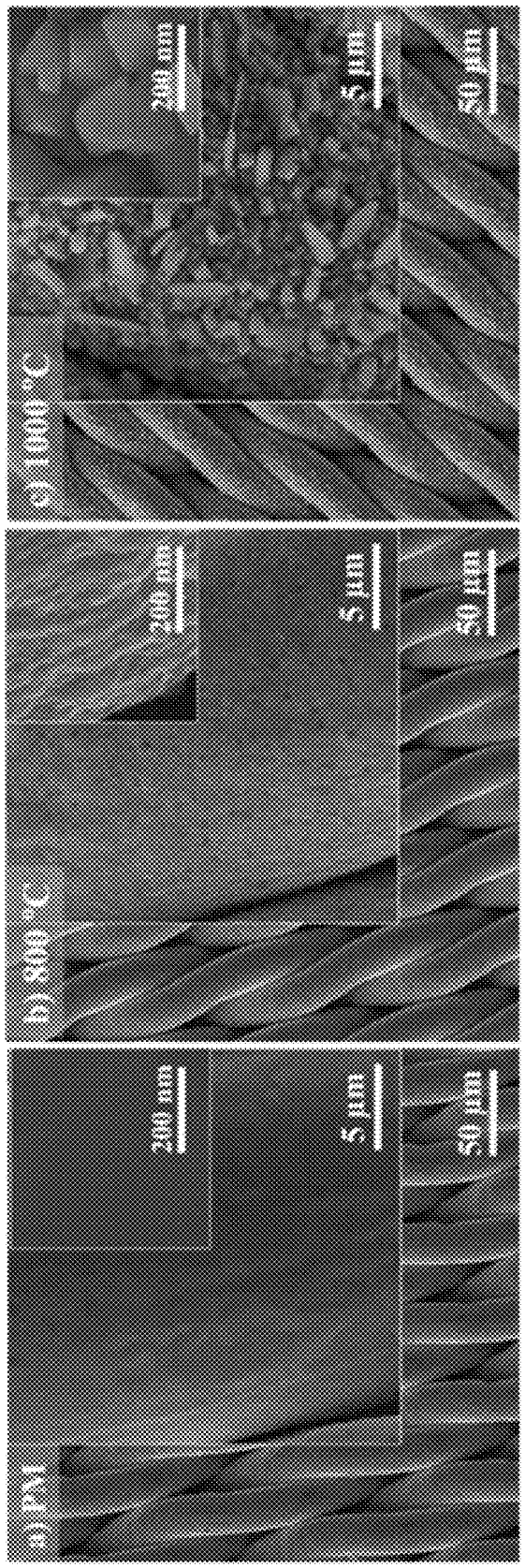

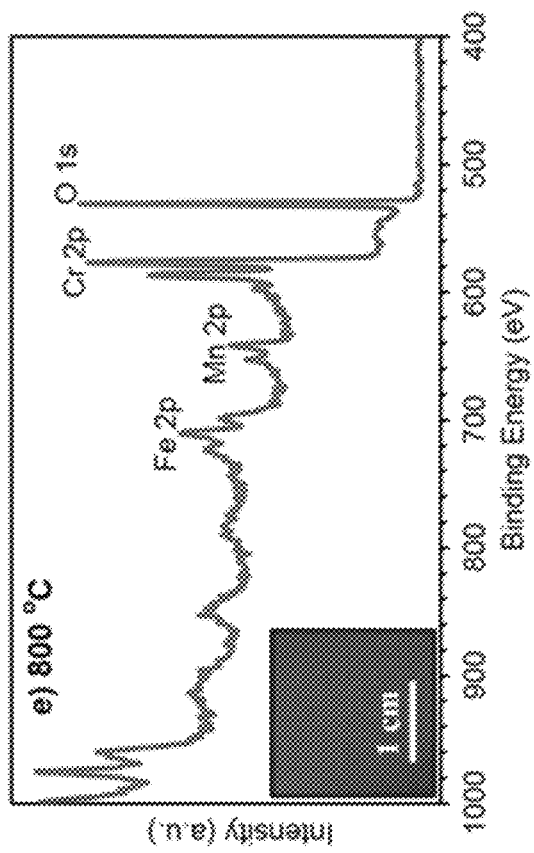
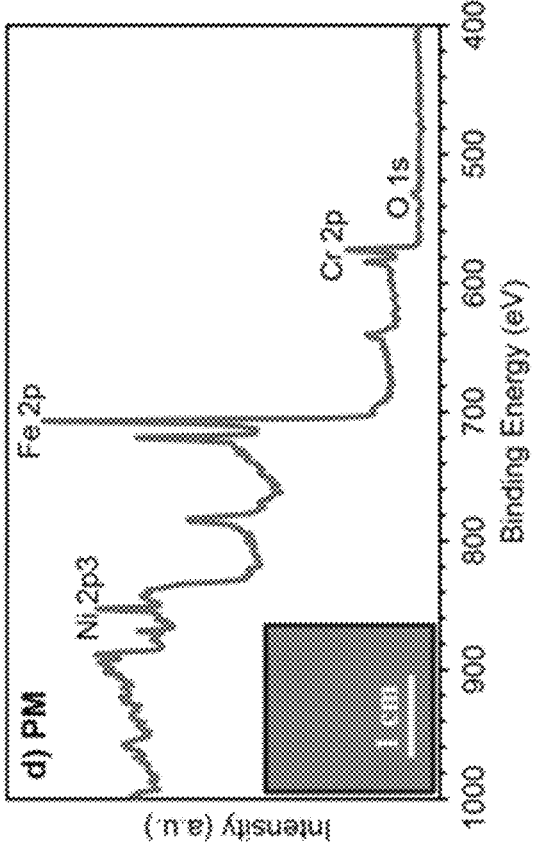
FIG. 2D
FIG. 2E

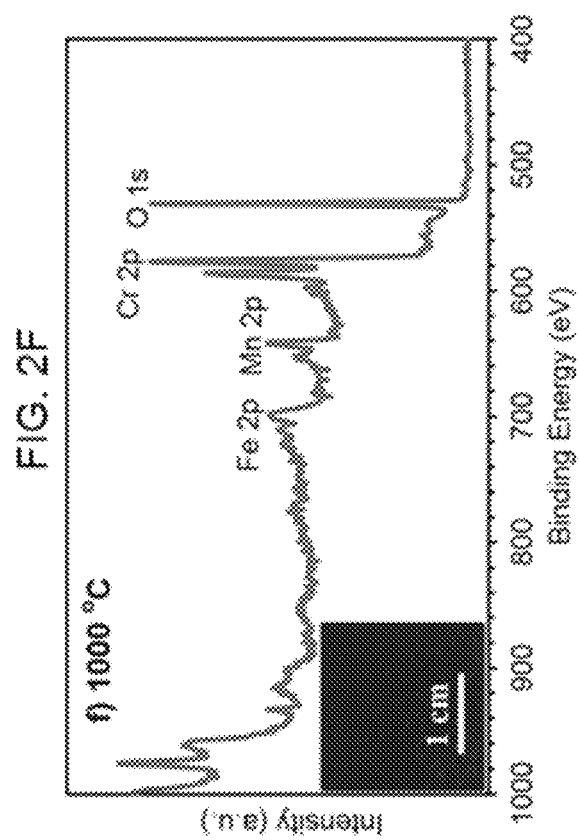

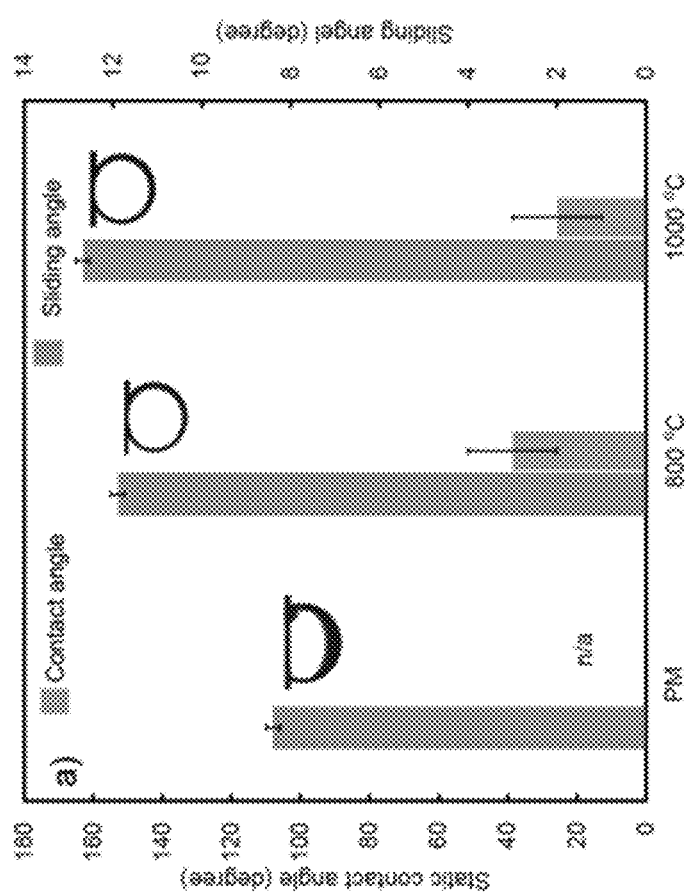
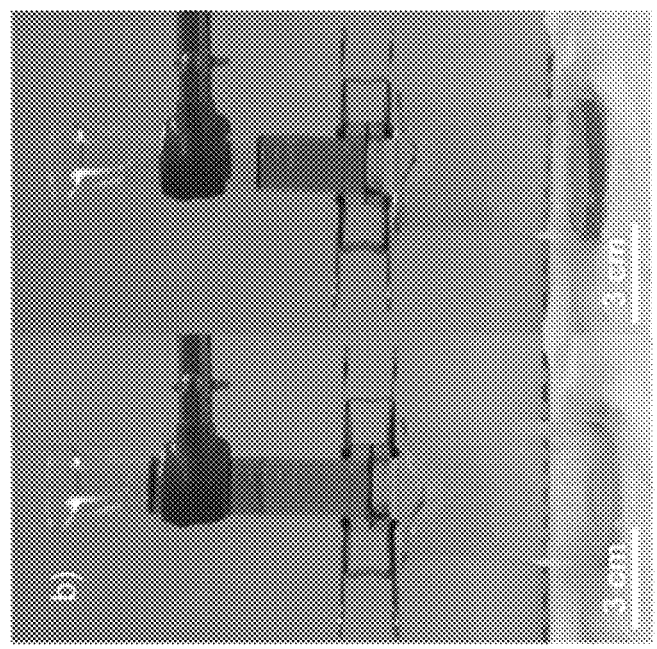
FIG. 3A
FIG. 3B

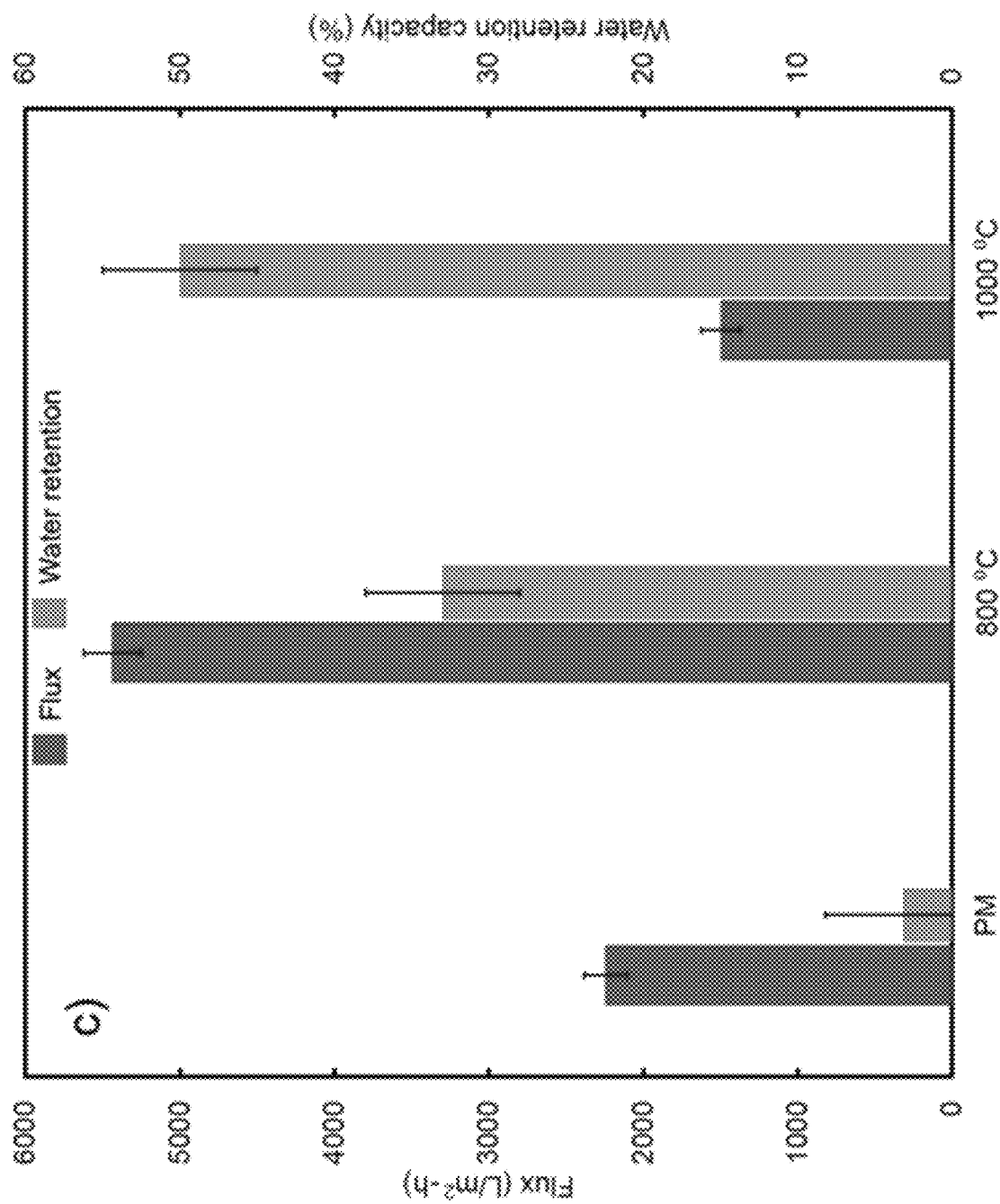

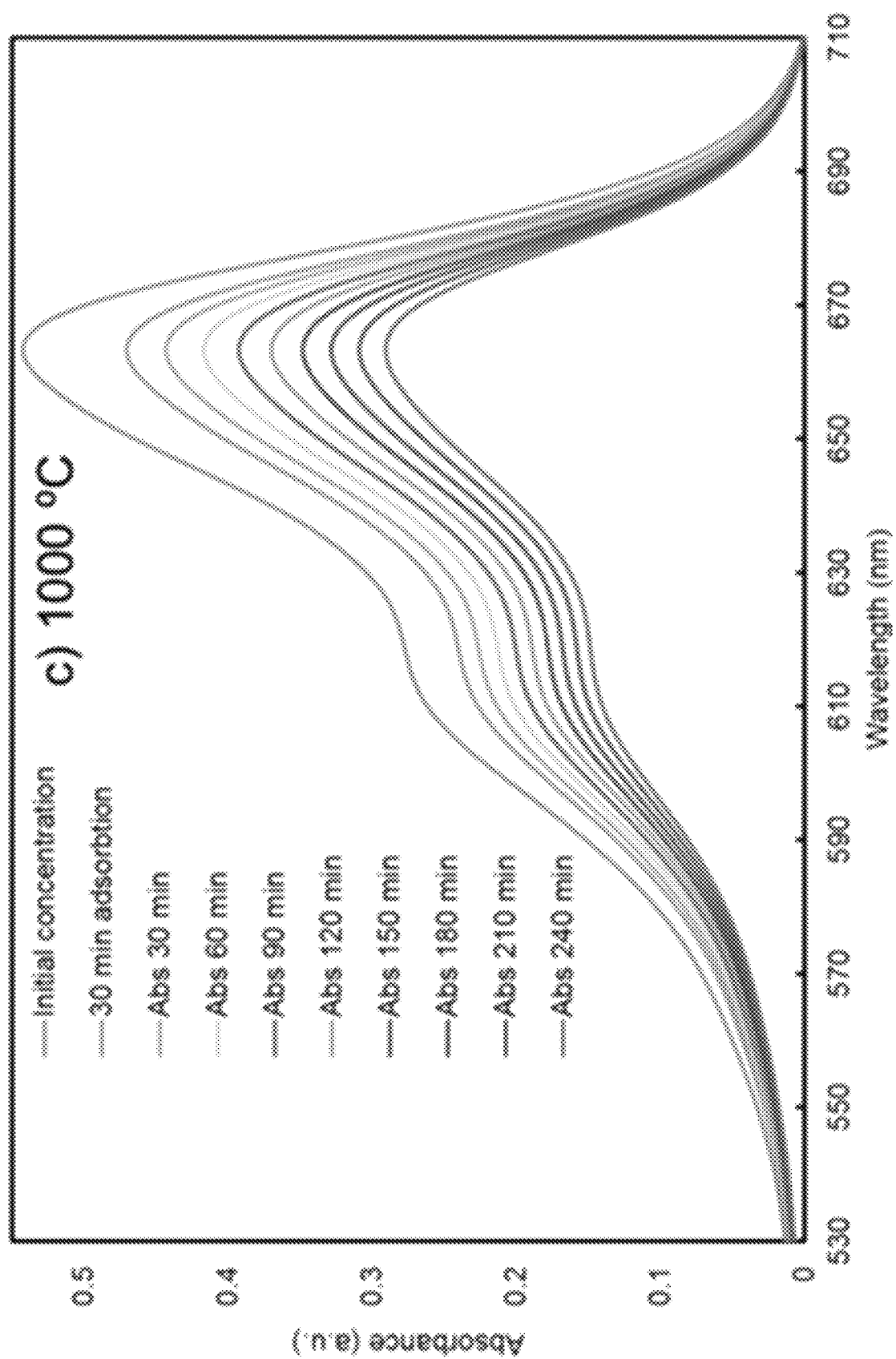

STAINLESS STEEL FILTER MEMBRANE WITH IRON OXIDE COATING

CROSS-REFERENCE TO RELATED APPLICATION

The present application is a Continuation of U.S. application Ser. No. 16/245,360, now allowed, having a filing date of Jan. 11, 2019 and claims benefit of priority to U.S. Provisional Application 62/642,954, filed Mar. 14, 2018 which is incorporated herein by reference for all purposes.

BACKGROUND

Field of the Invention

The invention falls within the fields of chemistry, environmental sciences, and wastewater management.

Description of Related Art

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

Integration of selective wettability and photocatalytic activity in a single unit operation is highly desirable for of oily wastewater remediation (i.e., separation of water-insoluble oils and degradation of water-soluble pollutants); see Gao, C. et al. Integrated oil separation and water purification by a double-layer $TiO_2$-based mesh. *Energy Environ. Sci.* 6, 1147 (2013); Li, L. et al. Underwater superoleophobic porous membrane based on hierarchical TiO 2 nanotubes: multifunctional integration of oil-water. *J. Mater. Chem. A Mater. Energy Sustain.* 3, 1279-1286 (2014); Liu, N. et al. In situ dual-functional water purification with simultaneous oil removal and visible light catalysis. *Nanoscale* 18558-18564 (2016). doi:10.1039/C6NR06583J; Lin, X. et al. In situ ultrafast separation and purification of oil/water emulsions by superwetting $TiO_2$ nanocluster-based mesh. *Nanoscale* 8, 8525-8529 (2016).

Membranes with selective wettability of water over oil (or vice versa) have received great attention due to their high separation efficiency and anti-fouling property; see Padaki, M. et al. Membrane technology enhancement in oil-water separation. A review. *Desalination* 357, 197-207 (2015); Lai, Y. et al. Recent Advances in $TiO_2$-Based Nanostructured Surfaces with Controllable Wettability and Adhesion. *Small* 12, 2203-2224 (2016); Li, L., Zhang, J. & Wang, A. Removal of Organic Pollutants from Water Using Superwetting Materials. *Chem. Rec.* 1-20 (2017). doi:10.1002/tcr.201700029; Kwon, G., Post, E. & Tuteja, A. Membranes with selective wettability for the separation of oil-water mixtures. *MRS Commun.* 5, 475-494 (2015).

According to Wenzel and Cassie Baxter equations, the surface energy and the surface roughness are the two important factors to contend with in the process of engineering a surface of desired wettability. Static contact angle and sliding angle are the key experimental parameters that characterize the wettability of the surface; see Tuteja, A., Choi, W., McKinley, G. H., Cohen, R. E. & Rubner, M. F. Design Parameters for Superhydrophobicity and Superoleophobicity. *MRS Bull.* 33, 752-758 (2008); Kota, A. K., Kwon, G. & Tuteja, A. The design and applications of superomniphobic surfaces. *NPG Asia Mater.* 6, e109 (2014); Kota, A. K., Choi, W. & Tuteja, A. Superomniphobic surfaces: Design and durability. *MRS Bull.* 38, 383-390 (2013).

Higher the contact angle, lower the affinity of the liquid on the surface and vice versa. Based on the contact angle value of a water/oil droplet $(\theta_{wd}/\theta_{oa})$ on a solid surface in air, solid surfaces can be classified into four regimes: superhydrophobic/superoleophobic $(\theta wa/\theta oa>150°)$, hydrophobic/oleophobic $(\theta_{wd}/\theta_{oa}>90°)$, hydrophilic/oleophilic $(\theta_{wd}/\theta_{oa}<90°)$ and superhydrophilic/superoleophilic $(\theta_{wd}/\theta_{oa} \sim 0°)$. Same classification can be applied in different environments like water in oil environment $\theta_{wo}$ or oil in water environment $\theta_{ow}$; see Kwon, G., Post, E. & Tuteja, A. Membranes with selective wettability for the separation of oil-water mixtures. *MRS Commun.* 5, 475-494 (2015); Ma, Q., Cheng, H., Fane, A. G., Wang, R. & Zhang, H. Recent Development of Advanced Materials with Special Wettability for Selective Oil/Water Separation. *Small* 12, 2186-2202 (2016).

The surface energy of the material is a necessary but not a sufficient factor to decide the wettability, as the surfaces with certain surface energies may not yield the expected contact angle. Hence, the second factor, the surface roughness and according to Wenzel equation, if a surface is hydrophilic by virtue of its surface energy, it becomes more hydrophilic and on the other hand if a surface is hydrophobic by virtue of its surface energy, and it becomes more hydrophobic by the introduction of surface roughness; see Tuteja, A., Choi, W., McKinley, G. H., Cohen, R. E. & Rubner, M. F. Design Parameters for Superhydrophobicity and Superoleophobicity. *MRS Bull.* 33, 752-758 (2008); Kota, A. K., Choi, W. & Tuteja, A. Superomniphobic surfaces: Design and durability. *MRS Bull.* 38, 383-390 (2013).

Coating the surface with a material of certain surface energy and surface roughness is one way of achieving the desired wettability which is widely found in literature and as mentioned earlier, it is also possible to modify the wettability of a surface by simply introducing a hierarchical surface roughness; see Gondal M A, Sadullah M S, Dastageer M A, McKinley G H, Panchanathan D, V. K. Study of factors governing oil-water separation process using $TiO_2$ films prepared by spray deposition of nanoparticle dispersions. *ACS Appl Mater Interfaces* 6, 13422-13429 (2014).

Based on the selective wettability of the membrane, membranes can be classified into: (i) superhydrophobic-superoleophilic membranes, where the oil is passed through and water is retained (i.e. oil-passing membrane) and (ii) superhydrophilic-superoleophobic, where water is passed and the oil is retained (i.e. water-passing membrane). The disadvantage of oil-passing membrane is that as the oil comes direct contact with the membrane surface, the surface easily gets fouled up and also as the density of water is higher than that of oil, water sneaks below the oil and forms a water layer and this prevents the efficient permeation of oil and hence limiting the efficiency of oil water separation; Kwon, G., Post, E. & Tuteja, A. Membranes with selective wettability for the separation of oil-water mixtures. *MRS Commun.* 5, 475-494 (2015). In the second water passing kind of membranes, in order for a surface to be superhydrophilic-superoleophobic, the surface energy of the surface should be lower than that of oil and higher than that of water and hence realizing membranes of such wettability is quite difficult. However, in compliance with the Wenzel, Cassie and Young-Dupré formulas, the surface, which is inherently hydrophilic in air, can be made as in-air superhydrophilic and underwater superoleophobic with the introduction of appropriate surface roughness; Gondal M A, Sadullah M S, Dastageer M A, McKinley G H, Panchanathan D, V. K.

Study of factors governing oil-water separation process using TiO$_2$ films prepared by spray deposition of nanoparticle dispersions. *ACS Appl Mater Interfaces* 6, 13422-13429 (2014). Superhydrophilic and underwater-superoleophobic textured membranes are considered as water-passing membrane that can separate oil-water mixtures under gravity (i.e., without applying external energy). This is because a denser phase (water) is allowed to permeate through the membrane while a lighter phase (oil) is repelled from the membrane surface.

Despite high separation efficiency, anti-fouling property and low energy consumption during separation operation, it can be limited by inability to degrade the water-soluble organic pollutants present in the permeate (e.g., water-rich permeate). Thus, photocatalytic materials such as TiO$_2$ have been implemented in separation membranes in order to degrade water-soluble organic pollutants in water-rich permeates; see Li, L. et al. Underwater superoleophobic porous membrane based on hierarchical TiO$_2$ nanotubes: multifunctional integration of oil-water. *J. Mater. Chem. A Mater. energy Sustain.* 3, 1279-1286 (2014); Liu, N. et al. In situ dual-functional water purification with simultaneous oil removal and visible light catalysis. *Nanoscale* 18558-18564 (2016). doi:10.1039/C6NR06583J; Lin, X. et al. In situ ultrafast separation and purification of oil/water emulsions by superwetting TiO$_2$ nanocluster-based mesh. *Nanoscale* 8, 8525-8529 (2016); Gao, C. et al. Integrated oil separation and water purification by a double-layer TiO$_2$-based mesh. *Energy Environ. Sci.* 6, 1147 (2013).

While a few methods have been developed to fabricate under-water superoleophobic-photocatalytic textured multifunctional membranes, these methods typically involve expensive equipment, environmental hazards, or multi-step processes. Furthermore, the wide band gap of most of these materials (>3.2 eV which is located in the UV region of the spectrum) limits the large-scale application of such material under solar light irradiation (i.e. UV spectrum is only 5% of the solar spectrum); see Mills, A. & Le Hunte, S. An overview of semiconductor photocatalysis. *J. Photochem. Photobiol. A Chem.* 108, 1-35 (1997); Herrmann, J. Heterogeneous photocatalysis: fundamentals and applications to the removal of various types of aqueous pollutants. *Catal. Today* 53, 115-129 (1999); Hoffmann, M. R., Martin, S. T., Choi, W. & Bahnemann, D. W. Environmental Applications of Semiconductor Photocatalysis. *Chem. Rev.* 95, 69-96 (1995); Asahi, R. Visible-Light Photocatalysis in Nitrogen-Doped Titanium Oxides. *Science* (80-). 293, 269-271 (2001).

Iron oxide (Fe$_2$O$_3$) and Fe$_2$O$_3$-based composites may be used as semiconductor photocatalysts with a visible-light responsive band gap ~2-2.3 eVgv; see Suresh, R. et al. Synthesis of Co$^{2+}$-doped Fe$_2$O$_3$ photocatalyst for degradation of pararosaniline dye. *Solid State Sci.* 68, 39-46 (2017); Mansour, A. M. Photocatalytic degradation of methylene blue with hematite nanoparticles synthesized by thermal decomposition of fluoroquinolones oxalato-iron(III) complexes. *RSC Adv.* 5, 62052-62061 (2015); Kleiman-shwarsctein, A., Hu, Y., Forman, A. J., Stucky, G. D. & McFarland, E. W. Electrodeposition of r —Fe$_2$O$_3$ Doped with Mo or Cr as Photoanodes for Photocatalytic Water Splitting. 15900-15907 (2008); Baumanis, C., Bloh, J. Z., Dillert, R. & Bahnemann, D. W. Hematite Photocatalysis: Dechlorination of 2,6-Dichloroindophenol and Oxidation of Water. *October* 25442-25450 (2011). doi:10.1021/jp210279r; Zhang, X., Li, H., Wang, S., Fan, F. R. F. & Bard, A. J. Improvement of hematite as photocatalyst by doping with tantalum. *J. Phys. Chem. C* 118, 16842-16850 (2014); Kamada, K. & Soh, N. Enhanced visible-light-induced photocatalytic activity of α-Fe$_2$O$_3$ adsorbing redox enzymes. *J. Asian Ceram. Soc.* 3, 18-21 (2015); Ibhadon, A. & Fitzpatrick, P. Heterogeneous Photocatalysis: Recent Advances and Applications. *Catalysts* 3, 189-218 (2013); Wei, Y., Han, S., Walker, D. A., Warren, S. C. & Grzybowski, B. A. Enhanced photocatalytic activity of hybrid Fe$_2$O$_3$—Pd nanoparticulate catalysts. *Chem. Sci.* 3, 1090 (2012). However, these materials are typically used on substrate types that are not amenable to use in membrane separation applications that require at least partial submersion in a liquid.

In view of the many limitations and problems associated with conventional membranes, the inventors disclose herein membranes having better combinations of oil-water separation and water-soluble organic pollutants removal in a single unit operation. This is highly desirable for oily wastewater remediation, such as for the separation of water-insoluble oils and degradation of water-soluble pollutants.

SUMMARY OF THE INVENTION

The inventors disclose a universal, scalable, solvent-free, one-step method based on thermal annealing of a stainless steel membrane to create a surface of appropriate texture that is optionally simultaneously surface energy modified; e.g., by modifying its chemical composition through surface growth of Fe$_2$O$_3$ and/or Fe$_2$O$_3$-based composites. For example, an advantageous surface roughness and chemical modification of the surface of a stainless steel mesh with pore size of 2 micron was obtained by annealing of the mesh at the temperatures of 800° C. and 1000° C. in the under certain conditions. This method of fabrication is rapid, simple, cost-effective and produces durable and robust annealed stainless steel membranes that show an excellent water affinity and strong underwater-oil repellency. These properties make the membrane suitable for commercial and industrial applications such as for gravity-driven separation of oil and water mixtures with a separation efficiency approaching 100%. The surface features of the annealed stainless steel membranes also provide excellent photocatalytic activity useful for degrading water-soluble organic pollutants such as methylene blue dye in an aqueous permeate upon UV or visible light illumination. These methods may be scaled up to provide robust multifunctional membranes for large-scale commercial or industrial applications such as for wastewater treatment.

BRIEF DESCRIPTION OF THE DRAWINGS

FIG. 2A. Field Emission Scanning Electron Microscope (FE-SEM) images of a pristine membrane at increasing magnifications as denoted by the scale bars of 50 μm (lower), 5 μm (middle) and 200 nm (upper right).

FIG. 2B. Field Emission Scanning Electron Microscope (FE-SEM) images of a membrane annealed at 800° C. at increasing magnifications as denoted by the scale bars of 50 μm (lower), 5 μm (middle) and 200 nm (upper right).

FIG. 2C. Field Emission Scanning Electron Microscope (FE-SEM) images of membrane annealed at 1,000° C. at increasing magnifications as denoted by the scale bars of 50 µm (lower), 5 µm (middle) and 200 nm (upper right).

FIG. 2D shows elemental composition of pristine membrane by X-ray photoelectron spectroscopy or XPW.

FIG. 2E shows elemental composition of 800° C. annealed membrane by X-ray photoelectron spectroscopy or XPW.

FIG. 2F shows elemental composition of 1,000° C. annealed membranes by X-ray photoelectron spectroscopy or XPW. The spectra shown in FIGS. 2D, 2E and 2F indicate the presence of Cr, Ni, Fe and Mn pertaining to the elemental composition of 316L stainless steel alloy and that the oxygen content on the membrane surface rose from 7.6% in pristine membrane to 53.0% in 800° C. annealed membrane and 52.4% in 1000° C. annealed membrane.

FIG. 3A shows the underwater sliding angle (first bar in each of three sets) along with an underwater contact angle of oil on the surface ($\theta_{ow}$) (second bar).

FIG. 3B shows separation of a mixture of oil and water (panel 1, oil/hexadecane is upper phase) into oil (panel 2, above membrane) and water/methylene blue dye (panel 2, in beaker below membrane).

FIG. 3C shows the permeation flux $L/m^2 \cdot h$ (left bar in each of three sets) with pristine (PM) and annealed stainless steel membranes at 800° C. and 1000° C. Water retention capacity % of the textured membranes is shown by the corresponding right bars. Water retention capacity is the ratio of the weight of trapped water (due to pre-wetting process) to the weight of the dry membrane.

FIG. 4C. Internal figure legends correspond to graphs in top to bottom order.

DETAILED DESCRIPTION OF THE INVENTION

Figure 1A:
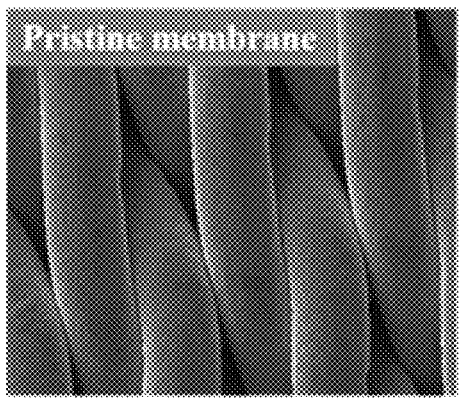
FIG. 1A shows a pristine stainless steel membrane before annealing.

A method according to the invention treats a porous stainless steel membrane in a way that modifies its surface features and properties conferring novel multifunctional properties on the modified porous stainless steel membrane.

Stainless steel is iron with a small amount of carbon (usually less than 0.5 percent) and other elements in small quantities. Grades of steel are determined by the amounts of non-ferrous components such as carbon, chromium, nickel, molybdenum, copper and titanium present. Austenitic stainless steel is a specific type of stainless steel alloy. Stainless steels may be classified by their crystalline structure into four main types austenitic, ferritic, martensitic and duplex. Asthenic stainless steels possess austenite as their primary crystalline structure (face centered cubic). This austenite crystalline structure is achieved by sufficient additions of the austenite stabilizing elements nickel, manganese and nitrogen. Due to their crystalline structure austenitic steels are not hard enable by heat treatment and are essentially non-magnetic. The 300 series austenitic stainless steels contain chromium (approx. 18 to 30%) and nickel (approx. 6 to 20%) as their major alloying additions. Type 304 is the most widely used alloy of all stainless steels. 300 Series Stainless steel alloys resist corrosion, maintain their strength at high temperatures and are easy to maintain. These include 301, 302, 303, 304, 304L, 316, 316L, 317, 317L, 317LMN, 321, 321H, 347, and 347H stainless steels. Both austenitic and ferritic stainless steels may be used in the invention.

In one embodiment the stainless steel filter of the invention is made from alloy 316/316L, which is molybdenum-bearing austenitic stainless steel; specifications: UNS S31600/S31603. The higher nickel and molybdenum content in this grade allows it to demonstrate better overall corrosion resistant properties than some other 300 series stainless steels such as 304, especially in chloride environments. 316L is the lower carbon version of 316 and has a chemical composition of Fe, <0.03% C, 16-18.5% Cr, 10-14% Ni, 2-3% Mo, <2% Mn, <1% Si, <0.045% P, <0.03% S. Conventional solution treatment annealing of 316 is typically performed at 1,010-1,120° C. with rapid cooling. 316L may be subject to pitting and crevice corrosion in warm chloride environments and to stress corrosion cracking above about 60° C. It is considered resistant to potable water with up to about 1,000 mg/L chlorides at ambient temperatures and to about 500 mg/L at 60° C. In another embodiment, Grade 317L stainless steel may be used having a composition of Fe, <0.08% C, 24-26% Cr, 19-22% Ni, ≤0.75% Mo, ≤2.0% Mn, ≤0.75% Si, ≤0.045% P, ≤0.03% S. In some embodiments 317L exhibits a higher resistance than 316L in the presence of chlorides.

Visible and UV light. Visible light is typically considered to have wavelengths in the range of 400-700 nanometers (nm) and ultraviolet light with a shorter wavelength within the range of 10 nm to 400 nm. A wavelength or range of wavelengths may be selected to degrade one or more particular contaminants. Examples of wavelengths include 10, 20, 30, 40, 50, 100, 150, 200, 250, 300, 350, 400, 450, 500, 550, 600, 650 or 700 nm or any intermediate value or subrange of these wavelengths. An appropriate wavelength or range may be determined by methods known in the art or those exemplified herein. Light used in conjunction with the invention, for example, for photocatalytic oxidation or degradation of methylene blue or other water-soluble organic compounds may be natural light like sunlight or artificial light A wavelength or range of light wavelengths may be selected based on absorbance of a particular contaminant, see e.g., FIGS. 4B and 4C. Visible or UV light may be focused, filtered, amplified or polarized.

In some embodiments of the invention, as illustrated in FIG. 4, an aqueous solution containing a contaminant (e.g., methylene blue) is contacted with a superhydrophilic porous stainless steel membrane of the invention under exposure to visible or UV light. A depth or thickness of a layer of contaminated water is selected that permits sufficient light or UV to reach the membrane and degrade the organic compound. In other embodiments, a photocatalytic reactor may circulate water over the surface of a membrane of the invention while being exposed to light or UV. Various kinds of photocatalytic reactors are known and can be modified to incorporate a stainless steel membrane according to the invention or for use with either solar radiation or artificial light or UV sources. These include those described by Bahneman, Solar Energy 77(5): 445-459 (2004); Sagawe, et al., Solar Energy 77(5): 471-489 (2004); or Chong, et al., Water Research 44(10):2997-3027 (2010) each of which is incorporated by reference.

Robustness. The membranes of the invention are robust and retain their essential surface features like roughness and chemical composition even after repeated use. While not being bound to any particular explanation, the inventors attribute this robustness to the growth of $Fe_2O_3$/and or $Fe_2O^3$ based composite on the surface of the porous stainless steel membrane during the annealing step. This growth occurs without the requirement for chemical treatment such as additional coating steps or pre-treatment with an iron oxide solution. Many conventional membranes are made by more complicated processes which require additional pre- or post-treatments or coatings to provide a rough surface that is mechanically robust and can withstand the harsh operational conditions.

In contrast, the invention only requires annealing of the stainless steel mesh within a specified temperature range and does not require treatment with Zn, W, or Ti or their oxides or salts (e.g., $WO_3$ or $TiO_2$) or exogenous iron or iron salts to create a robust, multifunctional surface. It is not necessary to produce a composite membrane with silica nanoparticles or other kinds of nanoparticles or non-stainless steel materials. Moreover, it is not necessary to incorporate or use metals or liquids exogenous to a stainless steel component of the membrane to create a robust, multifunctional surface. Such exogenous metals may include Sc, Y, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, B, Al, Ga, In, Tl, Ge, Sn, Pb, As, Sb, Bi, elements in the lanthanide series and the actinide series, mixtures thereof, mixtures of Groups IIa (Be, Mg, Ca, Sr and Ba) and VIb (Se and Te), or their metal salts. Exogenous liquids include oils and water-based compositions.

Nonlimiting embodiments of the invention include the following.

One embodiment of the invention is a superhydrophilic stainless steel membrane having a pore size ranging from 0.5, 1, 1.25, 1.5, 1.75, 2, 2.25, 2.5, 2.75, 3, 3.25, or 3.5 microns that comprises at least one surface containing a $Fe_2O_3$ and/or $Fe_2O_3$-based nanocomposite wherein said at least one surface has oxygen content of at least 10, 15, 20, 25, 30, 35, 40, 45, 50, 55 or 60%. The oxygen content on the surface of the annealed stainless steel membrane can be controlled within a range of 10, 20, 30, 40, 50 to 60% by adjusting the annealing temperature. Oxygen content may be measured by XPS.

In some embodiments the superhydrophilic stainless steel membrane is produced by annealing a stainless steel mesh membrane at 750, 775, 800, 825, 850, 875, 900, 925, 950, 975, 1,000, 1,010, 1,020, 1,030, 1,040, or 1,050° C. in the presence of oxygen; preferably within the range of 800-1,000° C. or 880-1,000° C. Oxygen may be present in air at an approximate amount of 21% by volume. Generally, oxygen is present in admixture with nitrogen and/or inert gases at ambient pressure. In some embodiments, oxygen may be present in lesser or greater amounts than 21% by volume, such 0.5, 1, 2, 5, 10, 15, 20, 25, 50, 75, or 100% (or any intermediate range) by volume. An oxygen containing gas may be present at a pressure higher than lower than ambient air pressure at sea level, such as at 0.25, 0.5, 0.75, 1, 1.25, 1.5, 2, 2.5, 3 or more atmospheres pressure. A thickness of a porous stainless steel membrane may be selected by one skilled in the art depending on the type of solution to be filtered as well as other solvent environment parameters such as temperature, pH, filtration rate, filtration pressure, amount of particulate matter, relative amounts of water and oils, or amounts of photodegradable contaminants. In some embodiments, the thickness of the membrane will be 100, 150, 200, 300, 400, 500, 600, 700, 800, 900, 1,000 or >1,000 microns. The length and width of the membrane may range upward into the meters, such as 0.25, 0.5, 1, 1.5, 2, 2.5, 3 or more meters.

In some embodiments, a filter containing the porous stainless steel membrane will be self-cleaning, resistant to microbial growth or attack, and/or can be sterilized with steam. In other embodiments such a filter will be a sanitary liquid filter (e.g., with crevice free design and filter parts that are crevice-free and polished to less than 0.6Ra), a high temperature filter to filter liquids at or above 25, 30, 35, 40, 45, 50, 55, 60, 65, 70, 75, 80, 85, 90 or 100° C., a high flow filter (e.g., that has a flow rate of up to 25,000, 50,000, 75,000, 100,000, 150,000 or 200,000 l/hr) or part of a filter management system (e.g., a system containing an intake, outlet, membrane housing, cartridge, self-cleaning filter, time-controlled valves and/or differential pressure control valves, that can discharge oversize contaminants or oil or other hydrophobic materials that do not pass through the filter, and warning alarms, lights or indictors that describe maximum differential pressure and line over-pressure to protect the filter or porous stainless steel membrane component of the filter from damage).

The morphology of the surface of the features on the stainless steel is preferably roughened and not smooth as shown by FIG. 2B or preferably cubic or cuboid as shown by FIG. 2C. Surface height, width or depth of features may be ±5, 10, 15, 20, 25, 30, 35, 40, 45, 50 or >50% the size of those depicted by FIG. 2B or 2C. In other embodiments morphologies that include shapes such as tetrahedral, irregular, octahedral, hexagonal, polygonal, parallelpiped, pyramidal, and flake or mixed surface structures may be included.

In other embodiments the morphology includes substantially planar plate-like particles having an aspect ratio (diameter to thickness ratio) of greater than 5, preferably from 5, 10, 20, 30, 40 to 50, advantageously from 10, 15, 20 to 25 or about 15. The flakes are preferably attached to the membrane or stainless steel surface through one or more edge portions.

The surface of the stainless steel mesh is preferably at least 80%, 90%, 95%, 98% or 99% coated with the morphological features of annealed/oxidized stainless steel surface. Individual crystallites of cubic morphology are preferably present as a substantially continuous surface of any exposed stainless steel surface such that cubic particles are in direct contact with one another to cover the surface of stainless steel. In a particular embodiment the surface of the stainless steel that is exposed, wherein exposed refers to the surface that is visible in an SEM viewed normal to the surface of the membrane. Preferably, individual crystalline cubic oxidation products and features are stacked irregularly at a depth of from 50, 100, 200, 300, 400, 500, 600, 700, 800, 900, 1,000 to >1000 nm, preferably from 100, 200, 300, 400, to 500 nm or about 250 nm. The crystallites preferably consist of $Fe_2O_3$. $Fe_2O_3$ may exhibit more than one phase, such as alpha-$Fe_2O_3$ which is rhombohedral, gamma-$Fe_2O_3$ which exhibits a cubic structure, is metastable and converted from alpha phase at high temperatures and beta-$Fe_2O_3$ which is cubic body-centered (space group Ia3), metastable, and at temperatures above 500° C. (930° F.) converts to alpha phase.

In another embodiment of the invention, prior to annealing, the stainless steel surfaces are treated with plasma, for example, by electron or ion bombardment, or by corona treatment, prior to treatment with oxygen during annealing.

Surface roughness may be measured by methods known in the art including those described by *Roughness measurements of stainless steel surfaces*, available at http://_www-.worldstainless.org/Files/issf/non-image-files/PDF/Euro_Inox/RoughnessMeasurement_EN.pdf (last accessed Jun. 18, 2018 and incorporated by reference). While it is not easy to measure the surface roughness of a porous membrane, the surface roughness can be measured by an optical profilometer for a flat stainless steel substrate annealed at the same temperature. In the examples, the inventors used the change in the contact angle based on Wenzel and Cassie-Baxter models of water in air and the contact angle of oil under water as indirect way to observe the growth of the nano- and microscale roughness. The contact angle of water on the pristine stainless steel surface in air $\theta_{wa}$ is around 860 (hydrophilic) and when the surface roughness is introduced by annealing at 800° C. and 1000° C., the surface became superhydrophilic with the contact angle $\theta_{wa}$ close to 0° with slight difference in water affinity. On the other hand, the underwater contact angle of oil on the surface ($\theta_{ow}$) increases with the annealing temperature and reached to the highest value of 1600 for 1000° C. annealed surface), whereas the sliding angle decreases with the annealing temperature and reached the lowest value of 5° for 1,000° C. annealed surface), indicating that the surface has nano- and microscale roughness. Many embodiments of the superhydrophilic membrane of the invention will exhibit one or more of the following properties: a super hydrophilicity characterized by a water contact angle (θ Wa) of 0, 0.25, 0.5, 0.75, 1, 1.25, 1.5, 1.75, 2, 2.25, 2.5, 2.75, 3, 3.5, 4, 4.5, or 5 degrees in air, preferably less than 2 degrees and more preferably about 0 degrees; an underwater contact angle of 120, 125, 130, 135, 140, 145, 150, 155, 160 or 165° ($\theta_{ow}$) for hexadecane oil on the surface of the membrane; an underwater contact angle of about 160° ($\theta_{ow}$) for hexadecane oil on the surface of the membrane; a sliding angle of about 5, 6, 7, 8, 9 or 10° for hexadecane oil on the surface of the membrane; a sliding angle of about 5° for hexadecane oil on the surface of the membrane. The contact angle of a superhydrophilic surface is ≤5 degrees.

Advantageously an embodiment of the invention will retain oil, such as hexadecane oil, and pass at least 80, 85, 90, 95, 96, 97, 98, 99, 99.5, 99.9<100 or 100% of water-in-oil emulsion, such as one having an oil droplet size of at most 0.25, 0.5, 0.75, 1, 1.25, 1.5, 1.75 or 2.0 μm, or other mixture of oil and water, for example, by gravity flow through the stainless steel membrane or by a centrifugal or pressurized flow.

In other embodiments, a ratio between the weight of trapped water due to pre-wetting to the weight of the dry membrane ranges between 20, 25, 30, 35, 40, 45, 50, 60 and 65 wt %. This ratio is also known as the water retention ratio.

In some embodiments, the stainless steel membrane of the invention will photocatalytically degrade environmental pollutants such as water-soluble organic molecules like methylene blue ("MB") in the presence of, or when irradiated with UV or visible light.

In preferred embodiments, the stainless steel membrane of the invention is mechanically robust and retains its surface roughness and chemical composition after use or repeated to separate a mixture containing oil and water or after use or repeated to photocatalytically degrade an organic compound in water. It will also retain functionality after cleaning, defouling or exposure to chlorine or other halogens or drying.

Another embodiment of the invention is directed to a method for making the superhydrophilic stainless steel membrane comprising annealing an uncoated stainless steel membrane in the presence of oxygen at a temperature ranging from 750, 775, 800, 825, 850, 875, 900, 925, 950, 975, 1,000, 1,010, 1,020, 1,030, 1,040, or 1,050° C. in the presence of oxygen; preferably within the range of 800-1,000° C. or 880-1,000° C., thereby producing the superhydrophilic stainless steel mesh membrane. Annealing is performed in the presence of air or oxygen as described above. In some embodiments, annealing will take place over a period of time ranging from 0.25, 0.5, 0.75, 1, 1.25, 1.5, 1.75, 2, 2.25, 2.5, 2.75, 3, 3.5, 4, 4.5, 5 or >5 hours, preferably about 2.5 to 3.5 hours. In some embodiments, the stainless steel membrane heated to the annealing temperature at a rate of 2, 3, 4, 5, 6, 7, 8, 9 or 10° C./min.

In some embodiments of this method an uncoated or not annealed stainless steel membrane is cleaned and dried, but not chemically pretreated, prior to annealing. In some embodiments the surface oxygen content of the uncoated or not annealed membrane will not exceed 5, 5.5. 6, 6.5, 7, 7.5, 7.6, 8, 8.5, 9, 9.5 or 10 atomic % (oxygen atoms/total atoms). In some embodiments, the superhydrophilic stainless steel membrane prior, during or after annealing is not further treated to increase its hydrophilicity, capacity to separate oil and water, or photocatalytic properties. This method may be performed using an uncoated or not annealed stainless steel membrane starting material that is a porous stainless steel mesh membrane, a woven porous stainless steel membrane, or a porous sintered stainless steel membrane. Preferably, the starting material is a porous stainless steel mesh membrane having a pore size ranging from 0.5, 1, 1.25, 1.5, 1.75, 2, 2.25, 2.5, 2.75, 3, 3.25, 3.5, 3.75, 4, 4.25, 4.5, 4.75 or 5 microns. In one embodiment, a stainless steel mesh exhibits the mesh pattern shown in FIG. 2A and each strand has a diameter or width ranging from 10, 15, 20, 25, 30, 35, 40, 45 or 50 microns.

Another embodiment of the invention relates to a method for water purification comprising contacting a mixture of water and at least one oil or other hydrophobic material with the superhydrophilic stainless steel membrane embodiments disclosed above and flowing water through the filter either by the force of gravity (gravity flow) or under pressure. Wastewater may contain oils, fats or grease or other hydrophobic contaminants, for instance, gray water containing kitchen oils or fats or water contaminated with commercial or industrial oils, fuels, or other hydrocarbons, such as those from trucks, automobiles or other vehicles or machinery. The invention also relates to a method for photocatalytic degradation of an organic compound such as methylene blue or other water-soluble environmental contaminants including contacting the organic compound with the stainless steel membrane of the embodiments disclosed herein in the presence of visible or UV light. Water-soluble organic compounds include those in pharmaceuticals, hormones, or herbicide or pesticide residues which may be partially metabolized or transformed by microorganisms.

EXAMPLES

Experimental Methods. The porous stainless steel membrane used to separate oil and water in this Examiner is a corrosion resistant annealed stainless steel (316L) square mesh of 3 cm sides, 1 mm thickness and 2 micron pore size.

Before annealing, the mesh was cleaned in an ultrasonic cleaner with deionized ("DI") water and acetone and dried by nitrogen.

The stainless steel mesh was annealed at 1 atmosphere pressure in air and heated at 5° C./min to a temperature of 800° C. or 1,000° C. an annealed at these temperatures for 3 hours.

The morphology and chemical compositions of the structures produced by annealing at 800° C. or 1,000° C. were evaluated using Field emission scanning electron microscope (FE-SEM, TESCAN ultra high resolution) and X-ray photoelectron spectroscopy, XPS (ESCALAB-250Xi System, Thermos-Scientific).

Figure 1B:
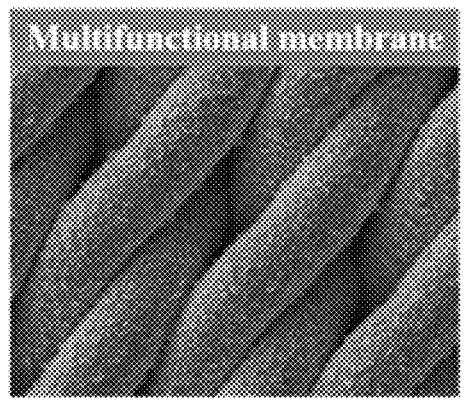
FIG. 1B shows a stainless steel membrane after annealing according to the invention.
Figure 1C:
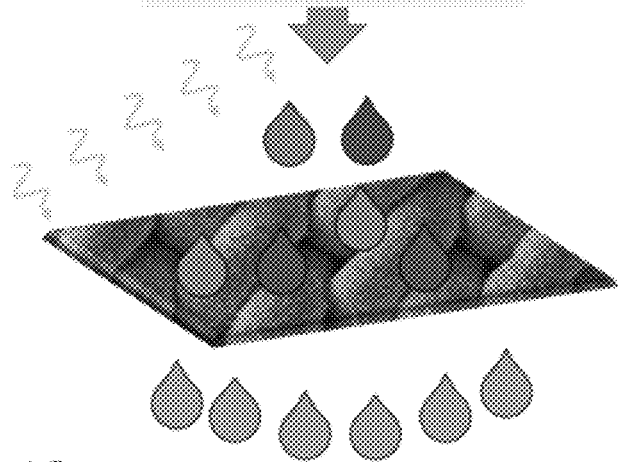
FIG. 1C depicts retention of oil (red drops) and photolysis of organic pollutants (purple drops), and passage of water through the annealed membrane (bottom drops).

When a liquid drop comes in contact with the solid surface of high surface energy, then the liquid tends to spread on the surface and this hydrophilic property of the surface is more pronounced if the surface is adequately roughened. Hence superhydrophilic surfaces can be fabricated by introducing appropriate surface texture on the surfaces of high solid surface energy; typically, solid-air interfacial tensions $\gamma_{sa} > 72$ mNm$^{-1}$. FIG. 1 shows a schematic illustration of fabrication procedure and application of the annealed membranes. 316L stainless steel membranes were annealed at two different temperatures 800° C. and 1,000° C. in the ambient conditions in order to create appropriate surface texture. In addition to this, annealing at this temperatures helps for simultaneous formation of the oxides of the elements present in the stainless steel alloy, particularly $Fe_2O_3$ and/or $Fe_2O_3$ based composites. The change in the surface texture and the formation of oxides by simple annealing transforms 316L stainless steel mesh into a multifunctional membrane in the oily wastewater remediation process, where the membrane with the favorable wettability functions as a medium for water-passing oil water separation (due to its improved surface texture) and also a visible-light responsive photo-catalyst, due to the formation $Fe_2O_3$ and/or $Fe_2O_3$ based composites, to simultaneously degrade water-soluble pollutants in the filtered water by photo-catalytic process. Also the formation of $Fe_2O_3$ and/or $Fe_2O_3$ based composites on the membrane surface ensures the applicability of this membrane in the abundant visible spectral region of solar radiation. FIG. 1 also shows the schematic for the simultaneous process of gravity driven oil water separation and photo-catalytic degradation of water-soluble pollutants to yield oil and organic pollutant free water.

Field Emission Scanning Electron Microscope (FE-SEM) images shown in FIGS. 2A, 2B and 2C with different magnifications are for the pristine membrane (PM), for the membranes annealed at 800° C. and at 1,000° C., respectively. The FE-SEM images for the pristine membrane (FIG. 2A) shows a quite smooth surface even at the highest magnification, which is quite typical. On the other hand, the FE-SEM images of the stainless steel membranes annealed at 800° C. and 1,000° C. shown respectively in FIG. 2B and FIG. 2C indicate the annealing temperature dependent surface roughness and structures. The progressive variation of the surface roughness structures between FIG. 2B and FIG. 2C is quite evident even in the medium magnification of the images and at the highest magnification. The stainless steel membrane annealed at 1,000° C. (FIG. 2C) clearly exhibits 3D cube-like nanostructures aligned in the same direction with the increased surface area. The selective formation of this advantageous if not essential surface morphology and roughness is not possible in the case of naturally formed rust. In some embodiments the surface roughness or 3D cube like nanostructures will increase surface area, by comparison to untreated pristine control membrane by 5, 10, 20, 30, 40, 50, 60, 70, 80, 90, 100, 150, 200, 250, 300 or >300%. Thermal sensitization may be used to form or grow a 3D-like nanostructure on the surface that is robust and hard. In some embodiments, the surface morphology or roughness (presence of small or large grains) for a particular metal alloy is controlled by thermal sensitization or selective depletion of one of the metallic components in the alloy at the grain boundaries.

In the invention, $Fe_2O_3/Fe_2O_3$ based composites are formed on the surface of the stainless steel membrane and hence (i) the membrane is mechanically robust, (ii) it provides the desired roughness to achieve the desired wettability and (iii) the surface composition, which controls water retention capacity and flux, can itself be controlled by annealing. Moreover, (iv) the features above decrease the pore size, thereby permitting use this membrane for the separation of water and oil in a water-in-oil emulsion. In contrast, in naturally formed rust the same chemical structure and morphology cannot be selectively achieved.

The elemental compositions of the membranes before and after annealing were studied using XPS. Before the analysis, the samples were Ar-sputtered (60 s, 2 kV) to remove the contaminations from the surface. The spectra shown in FIGS. 2D, 2E and 2F indicated the presence of Cr, Ni, Fe and Mn pertained to the elemental composition of 316L stainless steel alloy and also we can notice that the oxygen content on the membrane surface rose from 7.6% in pristine membrane to 53.0% in 800° C. annealed membrane and 52.4% in 1,000° C. annealed membrane. Upon visible inspection, the stainless steel membranes annealed at two different temperatures show two different colors with respect to that of the pristine membrane, which indicates that the annealing brought about different chemical composition on the membrane surface as you see in the insets of FIGS. 2D-2F. So it can be inferred that the excessive oxygen on the surface of the annealed membrane emerge from the oxidation of Fe and other metals to form $Fe_2O_3$ and $Fe_2O_3$-based nanocomposites. The annealed stainless steel membrane of the invention has the pore size of micrometer scale and this in combination with the textured nanostructures brought about by annealing results in the hierarchy of micro and nanostructures on the surface.

Oil and water separation. For testing efficacy of the annealed stainless steel membranes to separate water and oil, an oil-in-water emulsion containing hexadecane and deionized water at a 1:1 ratio and 0.3 mg/mL of sodium dodecyl sulfate ("SDS", Aldrich) was produced by stirring these ingredients at 800-1,000 rpm with a magnetic stirrer. The formation of oil-in-water emulsion was confirmed by measuring the resistance using millimeter.

For the oil water separation test, a stainless steel membrane was sandwiched between two glass tubes of 27 mm diameter and hexadecane-in-water emulsion was poured in the top glass tube for the gravity driven oil water separation. Trace amounts of oil present in the filtrate were estimated using thermogravimetric analysis (STA 449F3-Jupiter, Netzsch) and separation efficiency quantified using $R=(1-C_f/C_o) \times 100\%$, where $C_f$ and $C_o$ are the oil concentrations in the filtrate and the original oil/water mixture respectively. For thermogravimetric analysis the temperature of each sample was increased from room temperature to 105° C. at a rate of 5° C./min and then held at 105° C. for 50 min. As the boiling points of water and hexadecane are 100° C. and 287° C., respectively, the loss in water weight was used to estimate $C_f$.

As the annealed stainless steel membrane surfaces possess the required wettability for water passing gravity driven oil water separation and also the photocatalytic characteristics due to the formation of $Fe_2O_3$ and $Fe_2O_3$-based nanocomposites, this surface was used for the separation process of hexadecane-water mixtures contaminated with MB dye and degradation of MB dye in water. First, the oil-water separation test was performed by keeping a stainless steel separating membrane in between the two glass tubes and FIG. 3B (video S4 and S5) show the oil water separation process of free hexadecane-water mixtures contaminated with MB dye. As expected, with annealed stainless steel in place, when oil water mixture (blue: water and red: oil) was poured into the upper tube, MB contaminated water passed quickly through the separator and into the beaker, whereas the oil phase was effectively blocked by the membrane and remained on the upper tube. Furthermore, the annealed membranes exhibit high separation efficiency (99.9%) of oil-in-water emulsions with oil droplet size greater than 1 m. However, in the same oil water separation procedure, when annealed membrane was replaced with the pristine stainless steel membrane, the whole mixture of hexadecane and MB dyed water permeated through the membrane altogether, indicating that the pristine membrane is not capable for oil water separation. The thermogravimetric analysis showed that oil-water separation efficiencies for both the annealed membranes were 99.9%.

As shown in FIG. 3C, the permeation flux with annealed stainless steel membranes at 800° C. and 1000° C. are above 5450 and 1500 L m$^{-2}$ h$^{-1}$ respectively and this is due to the variations of pore size of the membranes set in at different annealing temperatures. The high flux is important in determining the economic viability of membrane separation. FIG. 3C also shows the water retention capacity of the textured membranes, which is the ratio between the weight of trapped water due to pre-wetting process to the weight of the dry membrane, i.e. (weight of wet membrane–weight of dry membrane)/weight of dry membrane). It is was found that the water retention capacity of the membranes annealed at 800° C. and 1000° C. are 33% and 50% respectively. This means that these membranes can keep the trapped water needed for the oil-water separation for long time as compared to the pristine membrane, which can keep only 3% of its weight. In addition, it indicates that residence time t within the photocatalytic reactor volume is increased and thus means higher degradation efficiency according to the Langmuir-Hinshelwood kinetic model. This increased water retention capacity is due to the water-favoring property of $Fe_2O_3$ and $Fe_2O_3$-based composites grown on the annealed membranes. Thus by simple annealing, we can enhance the crucial wettability of the membrane surface, required for the oil water separation and also can achieve high flux rate and separation efficiency.

Figure 4A:
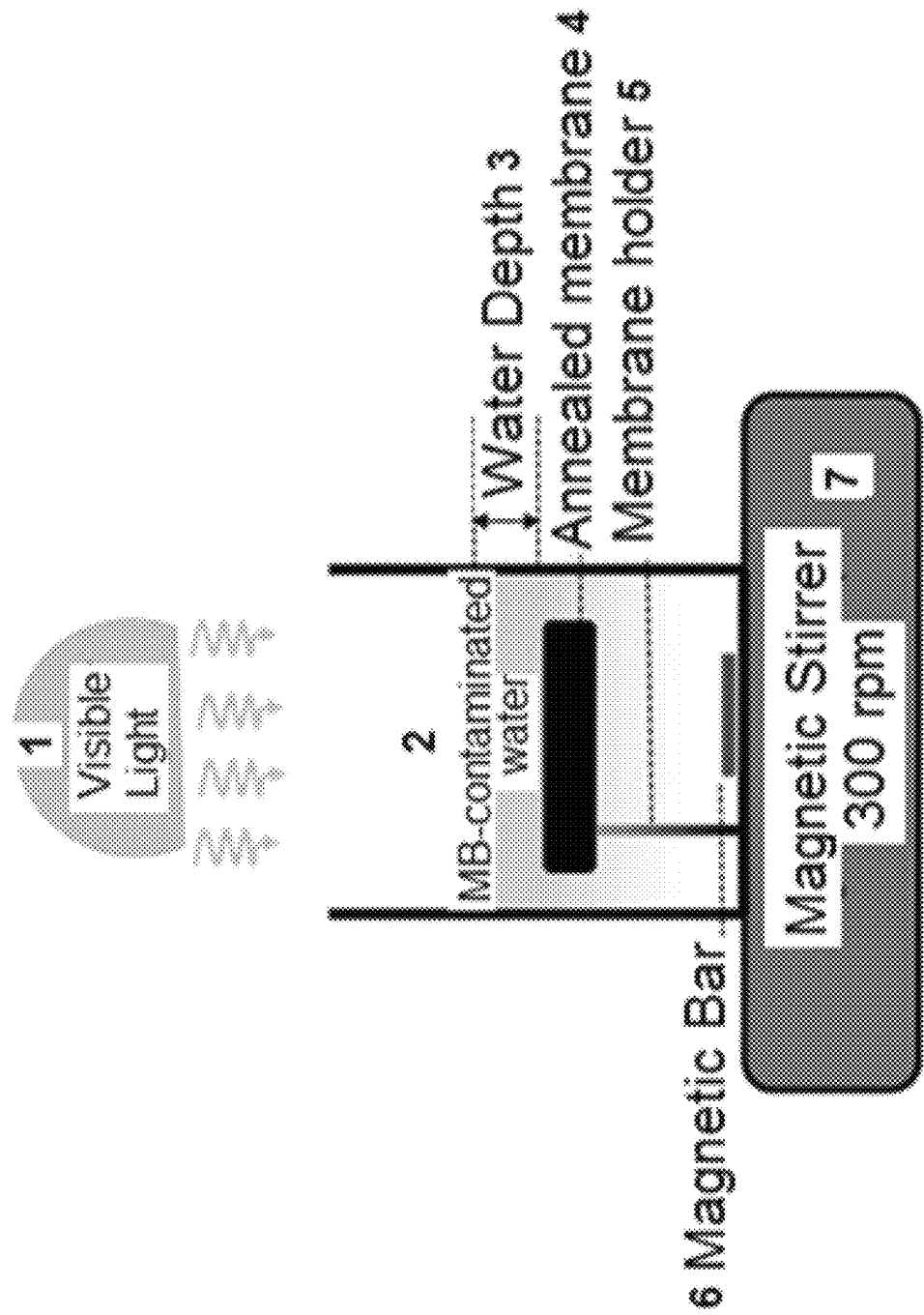
FIG. 4A. Schematic diagram of apparatus for photocatalytic degradation of MB dye. visible light (1). MB contaminated water (2). Water depth (3) about 2 mm. Annealed membrane (4) about 2.3 cm$^2$. Membrane holder (5). Magnetic bar (6). Magnetic stirrer (7).
Figure 4B:
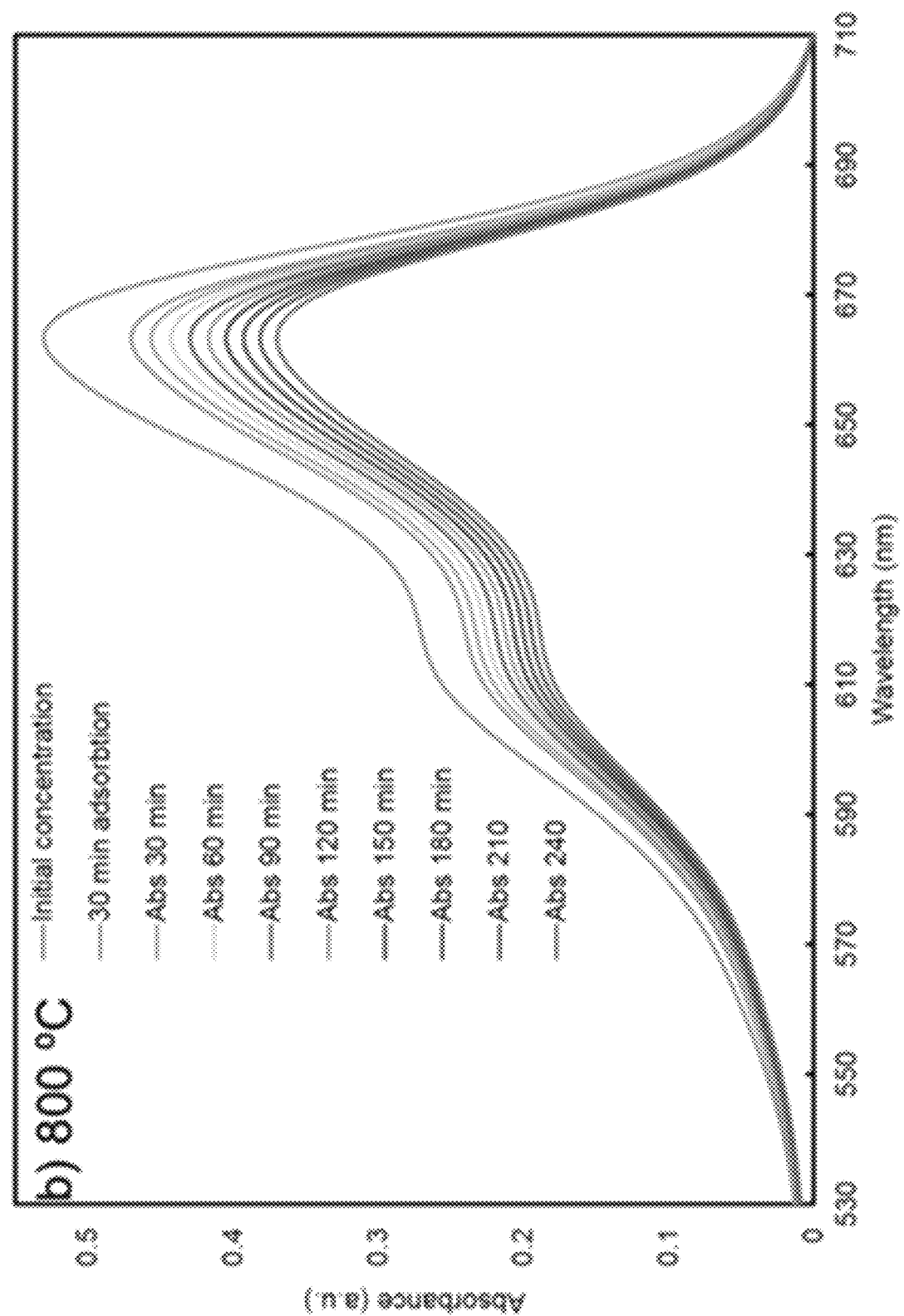
FIG. 4B. Absorption spectra of MB dye at regular time intervals using stainless steel mesh annealed at 800° C. Internal legends on figure are in top to bottom order, for example, in FIG. 4B the top curve is the initial concentration and the bottom curve is ABS at 240 mins.
Figure 4D:
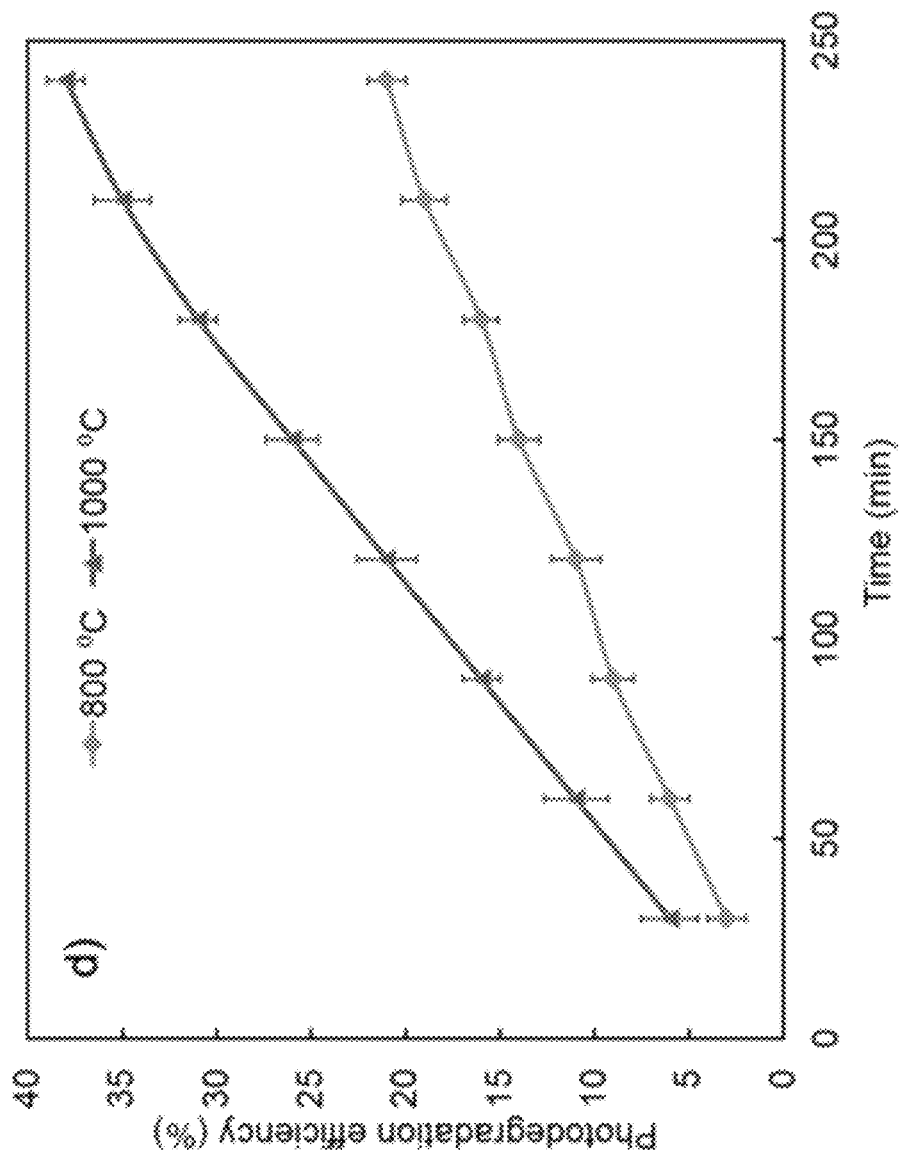
FIG. 4D shows photocatalytic degradation efficiency with irradiation time for annealed stainless steel meshes described for FIGS. 4B and 4C. Upper curve: 1,000° C. Lower curve: 800° C.

Photodegradative capacity. To evaluate activity of annealed stainless steel membranes containing $Fe_2O_3$ and/or $Fe_2O_3$-based composites as photodegradative catalysts, 10 mL of a 5 mg/L aqueous solution of methylene blue ("MB") from an oil and water separation was taken in a container as MB-dye-contaminated water. Water level was selected to be 2 mm above the surface of an annealed stainless steel membrane and was subjected to visible light irradiation from 300 W halogen tungsten lamp of 100 mW cm$^{-2}$ intensity with a 420 nm cut off optical filter. The irradiated MB dye-contaminated water was taken at a regular interval and its concentration was estimated from the absorption spectrum using UV-VIS spectrophotometer (Jasco 670). The degradation efficiency was evaluated using the formula (1–Ct/Ci)×100%, where Ci is the initial concentration of MB dye and Ct is the MB dye concentration at different times of irradiation respectively. The second favorable attribute brought about by annealing is the formation of $Fe_2O_3$ and $Fe_2O_3$-based composites on the membrane surface, which functions as an efficient photocatalyst with different active volumes for the degradation of organic pollutants present in the permeated water in the oil water separation process. The photocatalytic degradation of MB dye was carried out in a separate setup shown in the schematic diagram in FIG. 4A. Since the band gap energy of $Fe_2O_3$ is in the visible spectral region, we used a broad band light source (300 W halogen lamp with 100 mW cm$^{-2}$ intensity) with a 420 nm cut off filter. The annealed stainless steel membrane (2.3 cm$^2$) was immersed in 10 ml of MB dye (5 mg L$^{-1}$ dye concentration), which makes a water level only 2 mm above the membrane surface in order to reduce the light attenuation. Before irradiating the sample, this set up was kept in dark for 30 minutes to attain a thorough adsorption-desorption equilibrium. After turning on the light radiation for photo-catalytic degradation process, the irradiated sample was collected at a regular interval and subjected to UV-VIS absorption studies for determining the concentration of the dye. The absorption spectra of MB dye at regular time interval using stainless steel mesh annealed at 800° C. and 1000° C. are shown in FIGS. 4B and 4C respectively and the degradation efficiency with irradiation time for both the meshes are also shown in FIG. 4D. As it is clear from FIG. 4D, after 240 min of visible light irradiation, 20% and 40% of the MB dye from the initial concentration degraded when stainless steel mesh annealed at 800° C. and 1,000° C. respectively were used as photocatalyst. The higher degradation of MB dye using the stainless steel membrane annealed at 1,000° C. as a photocatalyst is attributed to its 3D-like nanostructure on its surface morphology, and the resulting enhancement in the surface area. The range of sensitization temperature can be used to control the surface roughness (small grains at low temperature or big grains at high temperature). Moreover, it is possible to dope the membrane during the thermal sensitization to enhance its photoactinic activity.

Contact and sliding angles. Oil contact angle and oil sliding angle measurements were made using a Goniometer (Kruss Easy Drop DSA20X). The contact angle of water on the pristine stainless steel surface in air $\theta_{wa}$ is around 860 (hydrophilic) and when the surface roughness is introduced by annealing at 800° C. and 1000° C. The surface became superhydrophilic with the contact angle $\theta_{wa}$ close to 0° with slight difference in water affinity as you see in the supplementary videos S 1-3. This superhydrophilicity on the membrane surface is attributed to the high surface energy of $Fe_2O_3$ and $Fe_2O_3$-based nanocomposites and the surface roughness generated by annealing. This is one of the wettability conditions of the surface required for the water-passing membrane.

FIG. 3A shows the underwater contact angle of oil on the surface ($\theta_{ow}$) along with the sliding angle. Although the static contact angle is the commonly used measure of the wettability of a surface, often it is not sufficient to describe the liquid repellency (hydrophobicity or oleophobicity) or sliding property of the surface. The surface with high static contact angles does not always slide easily from the surface and hence the combination of underwater contact angles and the sliding angles of oil on the surfaces are presented in FIG. 3A. It is quite clear from that the underwater contact angle of oil on the surface ($\theta_{ow}$) increases with the annealing temperature and reached to the highest value of 1600 for 1000° C. annealed surface), whereas the sliding angle decreases with the annealing temperature and reached the lowest value of 5° for 1,000° C. annealed surface), indicating that the surface became perfectly under-water superoleophobic (oil repellent).

As apparent from the Examples, the present disclosure describes a simple, solvent-less method for producing mechanically robust, scalable stainless steel multifunctional membrane with superhydrophilic properties. This annealed porous stainless steel membrane efficiently separates mixtures of oil and water by gravity flow and can photocatalytically degrade water soluble organic molecule pollutants such as methylene blue dye. These remarkable features on the 316L stainless steel membranes were brought about by annealing of the membranes at 800° C. or 1,000° C. The SEM images of the annealed membranes showed the introduction of a nanostructured surface roughness on the annealed membranes, this nanoscale roughness along with the microscale pore size of the membrane provided the necessary hierarchical structure to change the surface with the desired wettability of superhydrophilicity. Underwater superoleophobicity as confirmed by the respective contact angle and sliding angle measurements. The formation of $Fe_2O_3$ and/or $Fe_2O_3$-based composites on the annealed membrane surface, as shown by XPS, served as a visible light-driven photocatalyst for the degradation of organic dyes present in the water permeate. The improved wettability of the annealed membranes showed excellent oil-water separation efficiency in passing water though with very high permeation flux and retaining the oil on the top of a gravity flow separation. Furthermore, the annealed membranes exhibited an excellent photocatalytic degradation of methylene blue organic dye in the permeated water under visible light irradiation. The facile method of the invention provides a superior way to produce stainless steel filters for a variety of application including for treatment of oily or organic molecule contaminated waste water and for recovery of purified water suitable for agricultural or human use.

Terminology. Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology. As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A stainless steel filter, comprising:
    a woven stainless steel fiber mesh having an austenitic or ferritic crystalline structure;
    wherein the mesh has pores, wherein the pore size is from 1 to 3 microns;
    at least one surface of the mesh comprising a coating of $Fe_2O_3$ and/or $Fe_2O_3$ nanocomposite directly attached to the stainless steel, wherein the $Fe_2O_3$ and/or $Fe_7O_3$ nanocomposite has a morphology of nanostructures which are cubic, cuboid or planar plates aligned in the same direction, wherein an elemental oxygen content of the at least one surface is 50% or greater as determined by X-ray Photoelectron Spectroscopy (XPS).

2. The stainless steel filter of claim 1, wherein a water contact angle ($\theta Wa$) of the at least one surface of the mesh comprising the coating of $Fe_2O_3$ and/or $Fe_2O_3$ nanocomposite is from zero to two degrees in air.

3. The stainless steel filter of claim 1, wherein a hexadecane oil underwater contact angle of the at least one surface of the mesh comprising the coating of $Fe_2O_3$ and/or $Fe_2O_3$ nanocomposite is from 120° to 160° ($\theta_{ow}$).

4. The stainless steel filter of claim 1, wherein a hexadecane oil underwater contact angle of the at least one surface of the mesh comprising the coating of $Fe_2O_3$ and/or $Fe_2O_3$ nanocomposite is from 155° to 165° ($\theta_{ow}$).

5. The stainless steel filter of claim 1, wherein a hexadecane oil sliding angle of the at least one surface of the mesh comprising the coating of $Fe_2O_3$ and/or $Fe_2O_3$ nanocomposite is from 5° to 10° on the surface of the membrane.

6. The stainless steel filter of claim 1, wherein a hexadecane oil sliding angle of the at least one surface of the mesh comprising the coating of $Fe_2O_3$ and/or $Fe_2O_3$ nanocomposite is 5°.

7. The stainless steel filter of claim 1 that retains hexadecane and passes at least 95 wt % of the water in an oil-in-water emulsion having an oil droplet size of greater than 1 μm.

8. The stainless steel filter of claim 1, wherein a ratio between the weight of trapped water due to a pre-wetting process to the weight of the dry membrane is from 25 wt % to 60 wt %.

9. The stainless steel filter of claim 1, wherein a visible a visible-light responsive band gap of the at least one surface of the mesh comprising the coating of $Fe_2O_3$ and/or $Fe_2O_3$ nanocomposite is from 2 eV to 2.3 eV and the stainless steel membrane photocatalytically degrades methylene blue ("MB") when irradiated with visible light.

10. A method for making the stainless steel filter of claim 1, comprising:
    annealing an uncoated woven stainless steel fiber mesh in the presence of oxygen at a temperature ranging from 800° C. to 1,000° C. to obtain the stainless steel filter.

11. The method of claim 10, wherein the uncoated woven stainless steel fiber mesh is held at a temperature ranging from 800° C. to 1,000° C. at ambient pressure and in air for at least three hours.

12. The method of claim 10, wherein the uncoated woven stainless steel fiber mesh is heated at a rate of about 4-6° C./min to a temperature ranging from 800° C. to 1,000° C. under ambient pressure and in air for at least three hours.

13. The method of claim 10, further comprising cleaning and drying the uncoated woven stainless steel fiber mesh prior to the annealing; wherein the uncoated woven stainless steel fiber mesh has a surface oxygen content not exceeding 7.6%, and
the uncoated stainless steel membrane is not chemically pretreated.

14. A method for water purification comprising contacting a mixture of water and at least one oil or other hydrophobic material with the stainless steel filter of claim 1 and flowing water through the stainless steel filter.

15. The method of claim 14, wherein the water flows through the stainless steel filter by gravity flow.

16. A method for photocatalytic degradation of an organic compound comprising contacting the organic compound with the stainless steel filter of claim 1 in the presence of visible or UV light.

* * * * *